(12) United States Patent
Gorgen et al.

(10) Patent No.: US 10,397,823 B2
(45) Date of Patent: Aug. 27, 2019

(54) DEVICE AND METHOD FOR SCHEDULING DATA PACKET TRANSMISSION IN WIRELESS NETWORKS

(75) Inventors: Daniel Martin Gorgen, Eindhoven (NL); Tim Corneel Wilhelmus Schenk, Eindhoven (NL); Javier Perez Espina, Eindhoven (NL); Oscar Garcia Morchon, Eindhoven (DE)

(73) Assignee: SIGNIFY HOLDING B.V., Eindhoven (NL)

(*) Notice: Subject to any disclaimer, the term of this patent is extended or adjusted under 35 U.S.C. 154(b) by 436 days.

(21) Appl. No.: 13/877,195

(22) PCT Filed: Sep. 20, 2011

(86) PCT No.: PCT/IB2011/054116
§ 371 (c)(1),
(2), (4) Date: Apr. 1, 2013

(87) PCT Pub. No.: WO2012/042432
PCT Pub. Date: Apr. 5, 2012

(65) Prior Publication Data
US 2013/0188492 A1 Jul. 25, 2013

(30) Foreign Application Priority Data
Oct. 1, 2010 (EP) .................................... 10186080

(51) Int. Cl.
*H04L 1/18* (2006.01)
*H04W 28/02* (2009.01)
(Continued)

(52) U.S. Cl.
CPC ....... *H04W 28/0247* (2013.01); *H04L 1/1854* (2013.01); *H04L 12/1868* (2013.01);
(Continued)

(58) Field of Classification Search
CPC ..... H04W 74/02; H04W 74/06; H04W 74/08; H04W 74/04; H04W 72/12;
(Continued)

(56) References Cited

U.S. PATENT DOCUMENTS 5,602,839 A * 2/1997 Annapareddy ......... H04L 45/04
370/405
6,108,782 A * 8/2000 Fletcher et al. .............. 713/153
(Continued)

FOREIGN PATENT DOCUMENTS

| JP | 2003134128 A | 5/2003 |
| JP | 2006060408 A | 3/2006 |

(Continued)

OTHER PUBLICATIONS

Reuven Cohen et al: "A Scalable Scheme for Preventing Feedback Implosion in a Large-Scale Multi-Tier Sensor Network", Sensor mesh and Ad Hoc Communications and Networks (SECON), 2010 7th Annual IEEE Communications Society Conference on, IEEE, Piscataway, NJ, USA, Jun. 21, 2010 (Jun. 21, 2010), pp. 1-9, XP031707827.

(Continued)

*Primary Examiner* — Hashim S Bhatti
(74) *Attorney, Agent, or Firm* — Akarsh P. Belagodu (57) ABSTRACT

For load balancing in a large-scale wireless mesh network, a device, a system and a method are provided for controlling data packet transmissions in the wireless mesh network, wherein a time slot is randomly selected within a determined answer interval for transmitting an answer responding to a received data packet.

20 Claims, 5 Drawing Sheets

(51) Int. Cl.
    *H04L 12/18* (2006.01)
    *H04W 74/08* (2009.01)
    *H04L 1/00* (2006.01)
    *H04W 72/02* (2009.01)
    *H04W 72/12* (2009.01)

(52) U.S. Cl.
    CPC ..... *H04L 12/1881* (2013.01); *H04W 74/0833* (2013.01); *H04L 12/189* (2013.01); *H04L 2001/0093* (2013.01); *H04W 72/02* (2013.01); *H04W 72/12* (2013.01)

(58) Field of Classification Search
    CPC ... H04W 74/0833; H04W 4/02; H04W 4/025; H04W 8/00; H04W 8/08; H04L 12/189; H04L 1/1884; H04L 12/1881; H04L 2001/0093
    See application file for complete search history.

(56) References Cited

U.S. PATENT DOCUMENTS

| | | | |
|---|---|---|---|
| 7,133,373 B2 * | 11/2006 | Hester et al. | 370/311 |
| 7,135,976 B2 * | 11/2006 | Neff et al. | 340/572.1 |
| 8,000,726 B2 * | 8/2011 | Altman et al. | 455/456.3 |
| 8,798,613 B2 * | 8/2014 | MacNaughtan et al. | 455/422.1 |
| 2001/0043575 A1 * | 11/2001 | Kelly | H04B 7/18578 370/321 |
| 2003/0053427 A1 * | 3/2003 | Kanda | H04W 8/14 370/328 |
| 2003/0161268 A1 | 8/2003 | Larsson | |
| 2004/0151144 A1 * | 8/2004 | Benveniste | 370/336 |
| 2004/0218557 A1 * | 11/2004 | Kim et al. | 370/312 |
| 2005/0102071 A1 * | 5/2005 | Lapointe | B61L 15/0027 701/19 |
| 2005/0111452 A1 | 5/2005 | Mamillapalli | |
| 2005/0216812 A1 | 9/2005 | Leon | |
| 2006/0187836 A1 | 8/2006 | Frey | |
| 2007/0115827 A1 * | 5/2007 | Boehnke et al. | 370/236 |
| 2007/0206547 A1 | 9/2007 | Gong | |
| 2008/0132252 A1 | 6/2008 | Altman et al. | |
| 2008/0137624 A1 | 6/2008 | Silverstrim et al. | |
| 2008/0204358 A1 | 8/2008 | Sato | |
| 2008/0212476 A1 | 9/2008 | Konradsson | |
| 2009/0086706 A1 | 4/2009 | Huang | |
| 2010/0157838 A1 | 6/2010 | Vaswani | |
| 2013/0331119 A1 * | 12/2013 | Vaccari et al. | 455/456.1 |

FOREIGN PATENT DOCUMENTS

| | | |
|---|---|---|
| JP | 2007208471 A | 8/2007 |
| JP | 2010193243 A | 9/2010 |
| WO | WO02073882 A2 | 9/2002 |

OTHER PUBLICATIONS

Shuju Wu et al: "A Comparison of Multicast Feedback Control Mechanisms", Simulation Symposium, 2005. Proceedings. 38th Annual San Diego, CA, USA Apr. 4-6, 2005, Piscataway, NJ, USA,IEEE, Apr. 4, 2005 (Apr. 4, 2005), pp. 80-87, XP010787238.

Zhan, An-Dong et al., "Survey on Real-Time Routing Protocols for Wireless Sensor Networks", , in Proc. of the 2nd China Wireless Sensor Network Conference (CWSN—2008), Chongqing, China, Oct. 13-14, 2008. (A journal version is published by "Chinese Journal of Computer Science", vol. 35(11A): 234-238, 2008).

Paolo Casari et al., "Mobicam Poster Abstract: Geographic Forwarding and Adaptive Load Balancing in Wireless Sensor Networks", ACM SIGMOBILE Mobile Computing and Communications Review archive, vol. 11, Issue 2, Apr. 2007.

Ali Al-Hemyari et al., "Cross Layer Design in 802.16d", Austalian Journal of Basic and Applied Sciences, 3(3): 2009.

* cited by examiner

DEVICE AND METHOD FOR SCHEDULING DATA PACKET TRANSMISSION IN WIRELESS NETWORKS

FIELD OF THE INVENTION

The invention relates to a device, a system and a method for controlling data packet transmissions in a wireless network.

BACKGROUND OF THE INVENTION

Recently, wireless mesh networks attract more and more attention, e.g. for remote control of illumination systems, building automation, monitoring applications, sensor systems and medical applications. In particular, a remote management of outdoor luminaires, so-called telemanagement, becomes increasingly important. On the one hand, this is driven by environmental concerns, since telemanagement systems enable the use of different dimming patterns, for instance as a function of time, weather conditions and season, allowing a more energy-efficient use of the outdoor lighting system. On the other hand, this is also driven by economical reasons, since the increased energy efficiency also reduces operational costs. Moreover, the system can remotely monitor power usage and detect lamp failures, which allows determining the best time for repairing luminaires or replacing lamps.

Current radio-frequency (RF) based wireless solutions use either a star network topology or a mesh network topology. In a star network, a controller has a direct communication path to every node in the network. However, this typically requires a high-power/high-sensitivity base-station-like controller to be placed at a high location (e.g. on top of a building), which makes the solution cumbersome to deploy and expensive. In a mesh network, the plurality of nodes does in general not communicate directly with the controller, but via so-called multi-hop communications. In a multi-hop communication, a data packet is transmitted from a sender node to a destination node via one or more intermediate nodes. Nodes act as routers to transmit data packets from neighboring nodes to nodes that are too far away to reach in a single hop, resulting in a network that can span larger distances. By breaking long distances in a series of shorter hops, signal strength is sustained. Consequently, routing is performed by all nodes of a mesh network, deciding to which neighboring node the data packet is to be sent. Hence, a mesh network is a very robust and stable network with high connectivity and thus high redundancy and reliability.

In the prior art, mesh network transmission techniques can be divided in two groups: flooding-based and routing-based mesh networks. In a flooding-based mesh network, all data packets are forwarded by all nodes in the network. Therefore, a node does not have to make complicated routing decisions, but just broadcasts the data packet. By these means, the technique is quite robust. However, in large networks, the data overhead due to forwarding impacts the overall data rate. Moreover, collisions of data packets are more likely to occur, further reducing the overall performance. Hence, the main problem of this solution is the scalability. Routing-based mesh networks can be further divided into proactive and reactive schemes. In proactive routing-based mesh networks, all needed network paths are stored in routing tables in each node. The routing tables are kept up to date, e.g. by sending regular beacon messages to neighboring nodes to discover efficient routing paths. Although the data transmission is very efficient in such kind of network, the scalability is still low, since in big networks, the proactive update of the routing tables consumes large parts of network resources. Moreover, the routing tables will grow with the scale of the network. In addition, the setup of the network requires time and resources in order to build up the routing tables. Reactive schemes, in contrast, avoid the permanent overhead and large routing tables by discovering routes on demand. They use flooding to discover network paths and cache active routes or nodes. When routes are only used scarcely for single data packets, flooding the data packets instead of performing a route discovery might be more efficient. If routes are kept long enough to avoid frequent routing, reactive schemes degenerate to proactive schemes. An example for a reactive routing-based mesh network is used in ZigBee. However, the main problem of this protocol scheme is still the scalability of the network.

Thus, most transmissions in wireless mesh networks are performed in a multi-hop mode. Since then every data packet or message is transmitted multiple times due to the forwarding, thereby reducing the overall network throughput, the network scalability of wireless mesh networks is very limited. Also, data packet collisions are more likely to occur, further degrading the overall performance. In particular, when node-initiated data traffic, e.g. statistics report data or other time-uncritical data, is transmitted by a plurality of nodes to a data collector node or control center choosing nearly the same moment in time, an overload problem will arise, causing data collision and loss.

Moreover in non-reliable networks, such as RF networks, a data packet can also get lost during transmission for other reasons than collisions, e.g. due to network overload or deteriorated link quality. Retransmissions can reduce the likelihood, but never can guarantee a successful transmission. The likelihood of packet losses adds up, when a packet has to travel over multiple hops. In large-scale multi-hop networks, the number of hops a data packet has to travel is comparatively large. For instance, in a large RF telemanagement system comprising thousands of nodes, 20-40 hops are likely to occur. Hence, the delivery chance of an individual data packet decreases with its hop distance, since with every hop, there is a chance that the data packet gets lost. Moreover, due to congestions and temporary errors at routing level, the likelihood of packet losses in the multi-hop scenario increases further. This makes data acknowledgment at transport or application layer necessary, if delivery guarantees are required by the application. The drawback of an acknowledge mode, however, is that data acknowledgements increase the data load in the network and the experienced delay increases significantly, especially when data packets have to be retransmitted at transport or application layer. Moreover, when a multicast or broadcast data packet is responded to (acknowledged) by many or all receiver nodes within a short period of time, a so-called acknowledgement storm may occur, causing an overload problem in the neighborhood of the sender node and thus in data collision and loss. This can be avoided in globally scheduled networks, where every node has fix individual timeslots for transmissions. But this global schedule needs global coordination and configuration, thus involving a cumbersome set-up procedure. Furthermore, sending over a global schedule and creating a global schedule for all nodes create a high data overhead and management overhead, respectively. Moreover, when the slots are used only infrequently, this decreases drastically the possible bandwidth. Consequently, this approach is also not suitable for large-scale networks.

Hence, a big disadvantage in common wireless networks is constituted on the one hand due to the tedious deployment and configuration and on the other hand by the very limited network scalability. Especially, RF telemanagement networks suffer from significant overload due to their topology and size, particularly at local level, which limits their scalability. This occurs because messages are generated and transmitted by layers of the communication stack without considering the network topology. Improving the success and reliability of transmissions is therefore crucial in large-scale networks, such as street illumination systems with a high number of luminaire nodes. This is because end-to-end retransmissions typically occurring at the higher layers in the communications stack are far more costly and delay intensive. Consequently, efficient routing protocols are required for large-scale wireless networks in order to minimize data packet collisions and subsequent data loss and to achieve the required throughput, response times and robustness.

US 2006/0187836 A1 describes a communication device that delays or discards time-insensitive traffic prior to time-critical traffic by introducing a virtual bottleneck queue.

SUMMARY OF THE INVENTION

In view of above disadvantages and problems in the prior art, it is an object of the present invention to provide a device, a system and a method for transmitting data packets in a wireless network that solve the overload problem and provide a high level of scalability and transmission reliability, without requiring high processing power in each network node.

The object is solved by the features of the independent claims.

The invention is based on the idea that the message flow towards and/or from a data collector node is scheduled to balance the transmission load across time and/or network regions. Preferably, this is achieved in a cross-layer approach, wherein network components and protocols can make use of information available from each other, e.g. by means of cross-layer communication, thus relieving the data load in the neighborhood of a data collector node or control center and increasing the network scalability.

In one aspect of the present invention, a device is provided for controlling data packet transmissions in a wireless network. The device comprises a control unit that is configured to randomly select a time slot within a determined answer interval for transmitting an answer data packet to a sender of a received data packet. In particular, if the received data packet is a multicast or broadcast data packet, this helps to avoid data packet collisions at the sender, when some or all of the receivers having received the multicast or broadcast data packet respond with very short time lags. For instance, the received data packet may be a request for data delivery, upon which the receivers transmit the requested data as an answer. The receiver and the sender, respectively, can be any of the control center, the data collector node or the nodes. Hence, the device according to the present invention schedules data traffic when responding to a received data packet in order to balance the transmission load across time and network regions.

Preferably, the device can be added or coupled to at least one of a network node, a data collector node and a control center. Thus, the device is associated with a network node, which may also be a data collector node. The data collector node may be any node that is configured to communicate with a control center of the network and may function as a kind of gateway. For instance, the device may be adapted to be inserted in an existing circuit board or to be connected to an existing controller of the node. In particular, when the device is added to existing network components, existing wireless networks as street lighting systems can be upgraded to the inventive concept. In addition to the control unit, the device may further comprise a memory and/or a transceiving unit for receiving and transmitting data packets.

The wireless network may have a mesh topology. Furthermore, the nodes of the wireless network may be stationary and the positions of the nodes within the wireless network may be known. In the network, data packet transmission may be performed as multi-hop transmissions either in hop-by-hop acknowledge mode with acknowledgements for every hop or in end-to-end acknowledge mode. Thereby, successful data packet transmission is verified and unnecessary data packet retransmissions are avoided.

In a preferred embodiment, the received data packet is a multicast or broadcast data packet that is sent to more than one receiver, e.g. a request for data delivery. The answer may be a time-uncritical response data packet and/or an acknowledgement of the received data packet. Thus, the device according to the present invention may be adapted to optimize the data packet acknowledgement by scheduling the transmission of the acknowledgement. This way, a highly efficient acknowledged mode can be realized without causing an increased number of data collisions.

In one embodiment, the control unit of the device can differentiate between time-critical and time-uncritical data packets. For instance, the control unit performs an analysis step in order to determine whether the answer data packet is a time-critical or a time-uncritical data packet. By these means, it can be assured that time-critical data packets are transmitted without delay or even prioritized with respect to time-uncritical data packets. In addition, time-uncritical data packets will not block the transmission of time-critical data packets.

When a time slot is selected randomly within the determined answer interval for transmitting the answer data packets, the determination of the answer interval is preferably performed by the control unit of the device. The answer interval may be specific for the received data packet. For instance, if the answer data packet is a time-uncritical data packet, the answer interval may be determined to be longer than an answer interval for a time-critical answer data packet. The determination of the answer interval may also be based on a number of receivers of the received data packet, if the received data packet is a multicast or broadcast data packet. Additionally or alternatively, the determination of the answer interval may be based on a number of receivers of the answer data packet, i.e. on the number of nodes, to which the data packet is transmitted. Furthermore, the answer interval may be determined based on network characteristics, such as network capabilities, network topology, current network load and expected network load. Possibly, a schedule is stored in the device and the control unit can determine the answer interval by means of this schedule. Further additional or alternative criteria for determining the answer interval may be information included in the received data packet, e.g. network load determined or estimated by the sender, a deadline determined by the sender, a time stamp indicating a point in time, when the sender has generated or sent the data packet, etc. When the sender defines a deadline, before which the answer data packet has to be sent, the sender decides, when the answer has to be expected at the latest. This allows a sender to better adjust a retransmission timer. The deadline should define an answer interval longer than the time normally needed for receiving the data packet and transmitting the answer data packet. In case that a multicast data packet has to be answered, the probability of data collisions and subsequent data loss at the sender decreases with longer answer intervals.

In addition, the control unit may be adapted to distribute the network load over different network regions by scheduling the answers from network nodes to a data request message based on at least one of a hop distance, a network area and a network address of the respective node. In a preferred embodiment, when the device is associated with a node having a low hop distance to a data collector node, the control unit of the device may schedule data packet transmission to be prior than data packet transmission of a device in a network area with high hop distance to the data collector node. Thus, the device can shape data traffic considering the network topology. This way, it is ensured that data packets to be transmitted by a node in a low hop distance area do not pile up, so that nodes in the low hop distance area can serve as routers forwarding data packets from nodes in areas with higher hop distances. Thus, the load for nodes in the low hop distance area is reduced.

Furthermore, the control unit may be capable of setting back-off delays based on network topology, such as a spatial or geographical distance between the device and a data collector node, a hop distance of the device to a data collector node, a location of the device within the network, a network address associated with the device or a combination thereof. The back-off delay may refer to back-off delays of data retransmission introduced by a MAC layer or a network layer. Preferably, a back-off delay in a device close to the data collector node is shorter than the back-off delay in a device far from the data collector node.

In a further preferred embodiment, the control unit is configured to aggregate answer data packets into one answer-batch, when more than one data packet is received. By these means, the device according to the present invention is adapted to optimize the data packet response by aggregating a plurality of responses into one answer-batch. Thus, redundant headers can be omitted and data overhead can be reduced, so that the payload of the transmission can be increased, thus saving network resources. Here, the network load can be controlled very efficiently with respect to different network areas.

When answers to received data packets are assembled in one answer-batch, answers to the received data packets may be postponed, respectively, in order to be aggregated in the one answer-batch. Preferably, the determined answer interval is considered so that the answer batch is transmitted within the determined answer interval. When it is determined that the received data packets are received from a single sender, the answer-batch is unicasted to the one sender. Similarly, when it is determined that the received data packets are received from a plurality of senders, the answer-batch may be a multicast or a broadcast to more than one of the plurality of sender nodes. Thus, in one embodiment of the present invention, the control unit may aggregate answer data packets for an individual node and/or for a predetermined group of nodes in order to avoid unnecessary data overhead. In particular, if the answer data packets correspond to acknowledgements, which contain almost no payload, but still need the full network layer and MAC layer header, data overhead for a transmission is significantly reduced and network resources are saved. In case of forming an answer-batch for a predetermined group, the group of nodes may be determined appropriately, for instance based on network efficiency or on a distance between the respective nodes. However, it is also possible to determine the group of nodes based on their location within the network or on their network addresses or the like. Alternatively, a plurality of appropriate groups may be predefined and stored in each node.

In a preferred embodiment of the present invention, the device is used in a control network for telemanagement of a lighting system, e.g. a street lighting system. By means of such a telemanagement system, luminaire nodes may be easily switched on/off and/or the dimming pattern thereof may be controlled based on parameters, such as day-time, season, weather, ambience brightness, occurrence of traffic accidents, presence of road works, etc. These parameters may be determined by sensors provided with the luminaire nodes and may then be reported to a control center.

In a further aspect of the present invention, a system is provided for controlling data packet transmission in a wireless network, the system comprising a control center and a plurality of nodes, wherein the control center and/or at least one of the nodes comprises the device according to one of the above-described embodiments. Preferably, data packet transmission is performed via multi-hop transmissions in the wireless network. In one embodiment, the nodes are associated with luminaires of an outdoor lighting system.

Moreover, data packet transmission from a node to a data collector node or to a control center may be scheduled based on at least one of a location of the node within the network, a network address of the node and a hop distance of the node to the data collector node or to the control center. Preferably, the scheduling is performed by the device located in a node, so that the node may report to a data request message multicasted by a control center or by a data collector node with a node-specific delay. Additionally or alternatively, a node of the network may be polled by a control center or a data collector node based on its network location and/or on the hop distance to the data collector node or to the control center. The polling may be performed at a network layer, transport layer or application layer of the control center or the data collector node or by a device included therein. Then, after the polling, the nodes report at different moments in time, thus avoiding data packet collision.

In another aspect of the present invention, a method is provided for controlling data packet transmissions in a wireless network, wherein a time slot is randomly selected within a determined answer interval for transmitting an answer data packet to a received data packet. By these means, data traffic in a wireless network can be scheduled with respect to transmission times and network regions in order to avoid network overload and data loss.

DETAILED DESCRIPTION

Preferred applications of the present invention are actuator networks, sensor networks or lighting systems, such as outdoor lighting systems (e.g. for streets, parking and public areas) and indoor lighting systems for general area lighting (e.g. for malls, arenas, parking, stations, tunnels etc.). In the following, the present invention will be explained further using the example of an outdoor lighting system for street illumination, however, without being limited to this application. In the field of lighting control, the telemanagement of outdoor luminaires via radio frequency network technologies is receiving increasing interest, in particular solutions with applicability for large-scale installations with segments of above 200 luminaires.

Figure 1A:
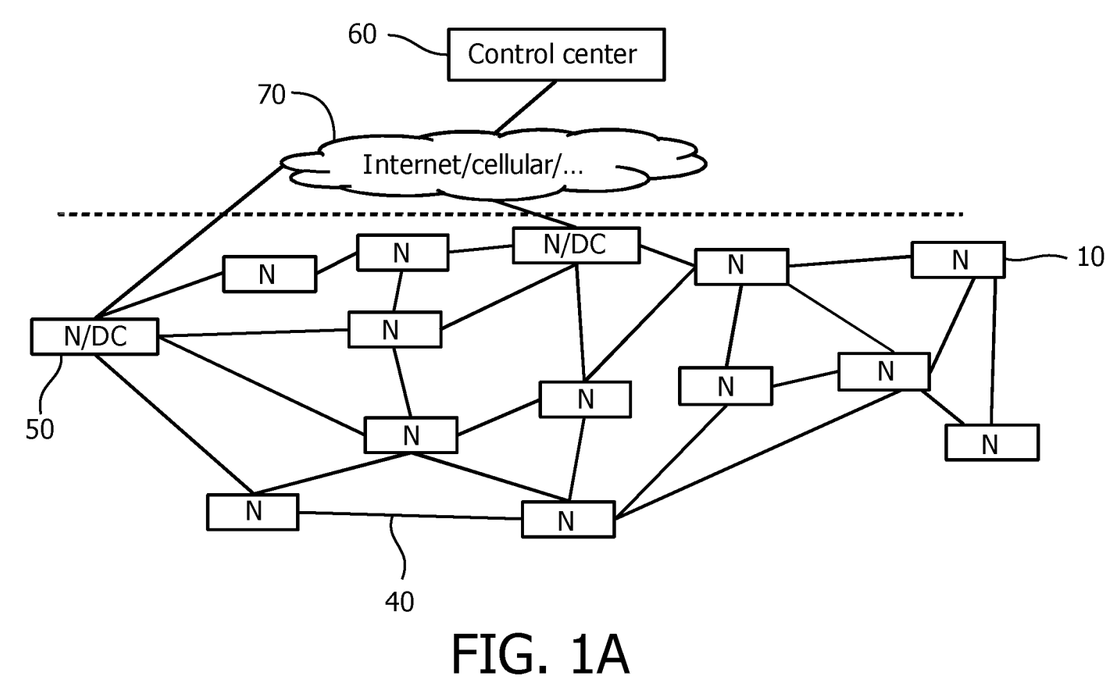
FIG. 1A illustrates an example of a wireless mesh network.

In FIG. 1A, a typical network with mesh topology is shown. A plurality of nodes 10 (N) is connected to each other by wireless communication paths 40. Some of the nodes 10 function as data collector nodes 50 (N/DC), which receive data packets from the surrounding nodes 10 via single-hop or multi-hop transmissions and transmit them to a control center 60 and vice versa. Thus, the data collector nodes 50 may operate in the manner of gateways between the nodes 10 and the control center 60. The wireless communication paths 40 between the nodes 10 and data collector nodes 50 may be constituted by RF transmissions, while the connection 70 between the data collector nodes 50 and the control center 60 may make use of the Internet, mobile communication networks, radio systems or other wired or wireless data transmission systems.

In a telemanagement system for outdoor lighting control, communication is very asymmetric. Most of the traffic is generated by the nodes 10, e.g. reporting their state, their dimming profile, sensor values or power usage to the control center 60. The other traffic consists of control commands from the control center 60 to the different nodes 10, e.g. for adjusting a dimming pattern or switching on/off lamps. Therefore, most traffic is constituted by N:1 traffic (unicasts), whereas the traffic from the control center 60 to the nodes 10 consists of 1:N traffic, either in unicast, multicast or broadcast mode. Moreover, the number of luminaire nodes 10 is extremely high in an outdoor lighting system such as a street lighting system. Hence, the size of the network is very large, especially when compared to common wireless mesh networks, which typically contain less than 200 nodes. In addition, the nodes 10 typically have limited processing capabilities due to cost considerations, so that processing and memory resources in the luminaire nodes 10 will be limited. Thus, communication protocols for transmitting data packets between single nodes 10 should consider the limited resources for efficient and fast data packet transmission. Furthermore, compared to other so-called ad-hoc mesh networks, the telemanagement system for an outdoor lighting control network is stationary, i.e. the nodes 10 do not move. Also, all nodes 10 may be connected to mains power. Consequently, network changes will be mainly due to a changing environment, e.g. due to traffic. If the nodes 10 are stationary, the physical positions of the nodes 10, for instance GPS coordinates, may be known in the system, enabling geographic or position-based routing. Furthermore, telemanagement of an outdoor lighting system does not require a high data rate. That means that a large part of the data traffic consists of time-uncritical data packets, e.g. status report data, statistical data, sensor data or the like. However, there are some scenarios, where a low response time is needed for a certain type of messages or data packets (time-critical data packets). For instance, when a traffic accident is detected, nodes 10 of the corresponding area can be controlled as to immediately switch to full power.

Figure 1B:
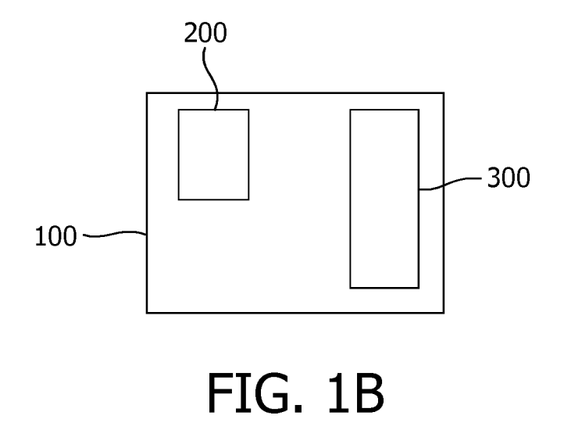
FIG. 1B illustrates a schematic view of a device according to the present invention.

In FIG. 1B, a device 100 according to the present invention is shown. The device 100 can be associated with a node 10, a data collector node 50 or the control center 60 of a wireless multi-hop mesh network. The device 100 comprises a control unit 200. Moreover, either the node 10, the data collector node 50 or the control center 60, respectively, or the device 100 comprises a transceiving unit 300 for transmitting or receiving data packets via wireless communication paths 40, e.g. via RF transmission. Since RF transmissions do not require high transmission power and are easy to implement and deploy, costs for setting up and operating a network using the device can be reduced. This is especially important for large RF networks, e.g. a RF telemanagement network for lighting systems. However, the data packet transmission may alternatively use infrared communication, free-space-visible-light communication or powerline communication.

Figure 2:
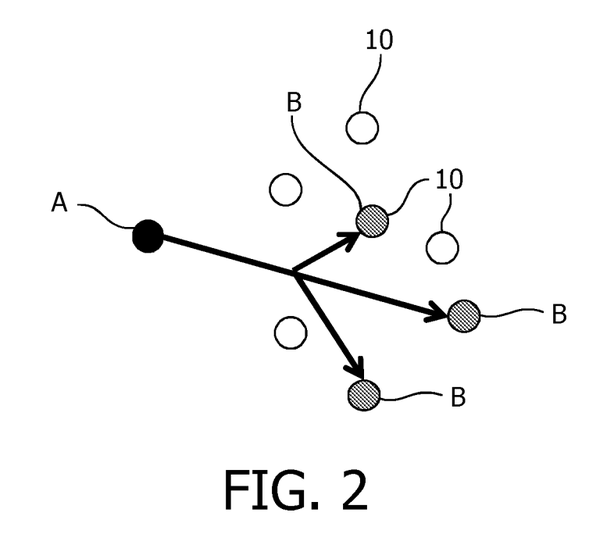
FIG. 2 illustrates multicasting.

As shown in FIG. 2, data packet transmission from a sender A to several specific receivers B among the plurality of network nodes 10 can be performed as a multicast (arrows). The sender A or at least one of the receivers B may also refer to a data collector node 50 or the control center 60. Preferably, however, data packet transmission from the data collector node 50 to the respective luminaire nodes 10 is performed by flooding, wherein all data packets are forwarded by all luminaire nodes 10 in the network. The data packet contains at least information about the sender A and one or more destination nodes 10 or receivers B. The data packet is then decoded by the at least one destination node 10. For data packet transmission from the luminaire nodes 10 to the data collector nodes 50, a routing-based solution is preferred. Preferably, a proactive routing structure is used, since the routes to the data collector nodes 50 are regularly used. In the proactive routing structure, a routing table is stored in every node 10, indicating which neighboring node 10 can act as connection towards the data collector nodes 50. Thus, data packets can be sent to the closest data collector node 50 in a very efficient and fast way. Advantageously, each node 10 keeps information about multiple downlink neighboring nodes 10 as alternative routes in order to increase reliability. If one neighboring node 10 is not reachable due to strong interference or complete failure, the routing protocol has then additional alternatives to route the data packet to the data collector node 50.

Hence, in a wireless network, transmission of the same data packet to multiple nodes 10 (groups or even all nodes 10) can be efficiently achieved by broadcasting or multicasting the data packet (see FIG. 2). However, if a delivery guarantee is required and therefore, the broadcast or multicast transmission was performed in acknowledged mode, a so-called acknowledgement storm may occur at the sender A, resulting in data collision and loss. Therefore, according to one embodiment of the present invention, data acknowledgement is scheduled randomly by each receiver B as shown in FIG. 3.

Figure 3:
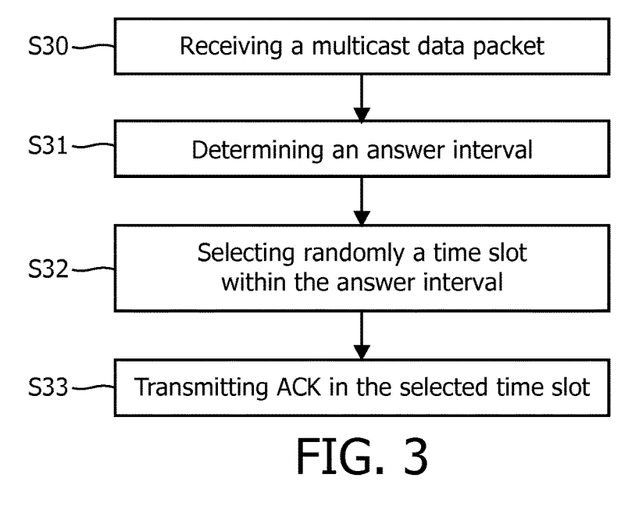
FIG. 3 illustrates a flow diagram for optimized data transmission according to one embodiment of the present invention.

In FIG. 3, optimized data transmission according to one embodiment of the present invention is exemplarily illustrated for acknowledgement transmission. After a receiver B has received a multicast or broadcast data packet from a sender A (S30), each receiver B determines an answer interval (S31). After determining the answer interval (S31), the receiver B selects randomly a time slot within the answer interval (S32) and transmits an acknowledgement data packet to the sender A in the selected time slot (S33), confirming the successful receipt of the received data packet.

The answer interval may be determined based on the number of receivers B, to which the multicast or broadcast data packet was sent. For instance, if a data packet is sent to a large number of receivers B, the answer interval may be determined to be longer than for a data packet sent to only a few receivers B. The number of receivers B may be predetermined for a certain kind of data packets. For instance, when using a group address for the multicast data packet, the group address may refer to a predetermined group of receivers B with a predetermined number of nodes 10. In particular, when a data request message is a multicast or a broadcast by a data collector node 50 or the control center 60, each receiver node 10 may know the number of receivers B that will respond to the received data request. The answer interval may also be determined based on information included in the received data packet. Thus, the sender A may know or estimate the amount of receivers B in a group and add this information to the multicast or broadcast data packet. Additionally or alternatively, the sender A may estimate or determine a current or expected network load. Possibly, the answer interval is determined to be similar for each receiver B. However, since every receiver B randomly picks a time slot out of the answer interval and transmits its answer data packet in the selected time slot, a data collision at the sender node 10 becomes less likely. Of course, the longer the answer interval or the lower the number of receiver nodes B, the less likely are data collisions. Thus, data loss is reduced and retransmissions can be avoided.

In a further embodiment, the sender A transmits a deadline with the data packet, when an answer data packet, e.g. an acknowledgement, has to be transmitted at latest. Then, the answer interval will be determined as the time interval from the time of receiving the data packet and the predetermined deadline. Each receiver B selects at random a time slot within this answer interval, i.e. before the deadline, and transmits then its answer data packet within the selected time slot. Alternatively, the received data packet comprises a time stamp, e.g. indicating the time of completing the data packet or transmitting the data packet by the sender A, which is then used by each receiver B as reference in order to determine the answer interval. For instance, a predefined time interval may be stored in each node 10, e.g. depending on the kind of received data packet, so that with the time stamp and the predefined time interval, each receiver B can easily determine the deadline, until which an answer data packet to the received data packet has to be sent. Thus, by including a deadline or a time stamp in the data packet, so that the deadline and, thus, the answer interval can be determined, the sender A can shape the data traffic. Possibly, the sender A accounts for current or expected network load, when setting the deadline. By specifying a deadline, the sender A can furthermore optimize the adjustment of a retransmission timer, since it decides itself, when the last answer data packet has to be expected at latest.

Of course, the process shown in FIG. 3 is not limited to data acknowledgement. In contrast, this process can be adapted for scheduling any response to multicast or broadcast data packets, e.g. answers to multicast data request messages. By these means, a randomized schedule for answering to received multicast data packets is created locally at each receiver B in an ad-hoc manner, thus minimizing the probability of a data collision in the network e.g. at the sender A.

One big disadvantage of the acknowledge mode is that acknowledge data packets contain almost no payload, but still need the full network layer and MAC layer header, thus contributing to network overload. That means that the overhead of an acknowledgement data packet is very high compared to other data packets and the transmission of acknowledgements fills therefore in many cases a significant amount of the available payload. Hence, according to the present invention, multiple independent acknowledgements can be additionally aggregated into one answer-batch, as shown in FIG. 4.

Figure 4A:
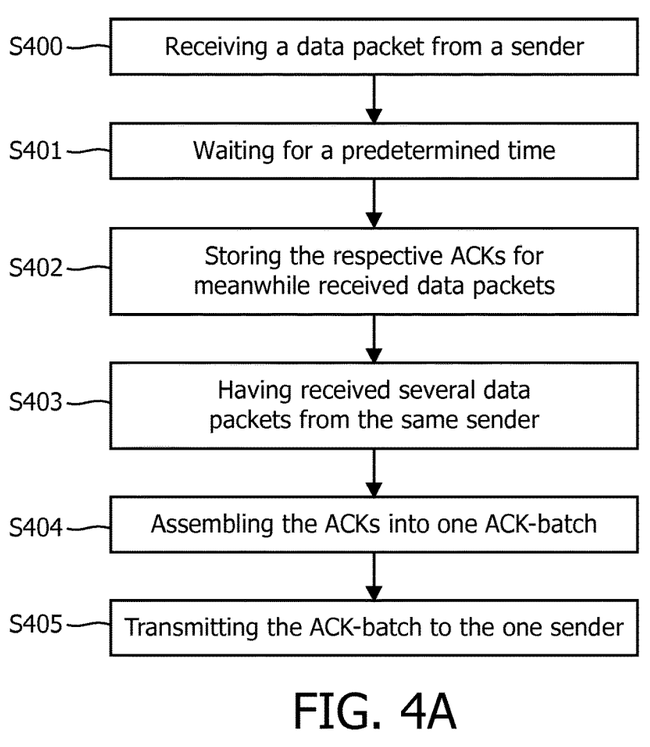
FIG. 4A illustrates a flow diagram for optimized data transmission according to another embodiment of the present invention.

In FIG. 4A, an embodiment for aggregating several acknowledgements is shown for the case that the acknowledgements correspond to data packets received from the same sender A. When a receiver B receives a data packet from a sender A (S400), the receiver B waits for a predetermined time (S401), whether more data packets are received. This makes it more likely that an aggregation takes place. Thus, the receiver B postpones the acknowledgements to data packets received during this predetermined time and stores the respective acknowledgements (S402). After the predetermined time has passed, the receiver B determines, whether several data packets have been received from the same sender A. In case that several data packets are received from the same sender A within the predetermined time interval (S403), acknowledgements for these data packets are assembled in S404 into one answer-batch or acknowledgement-batch (ACK-batch). The ACK-batch is then transmitted or unicasted to the one sender A (S405).

Figure 4B:
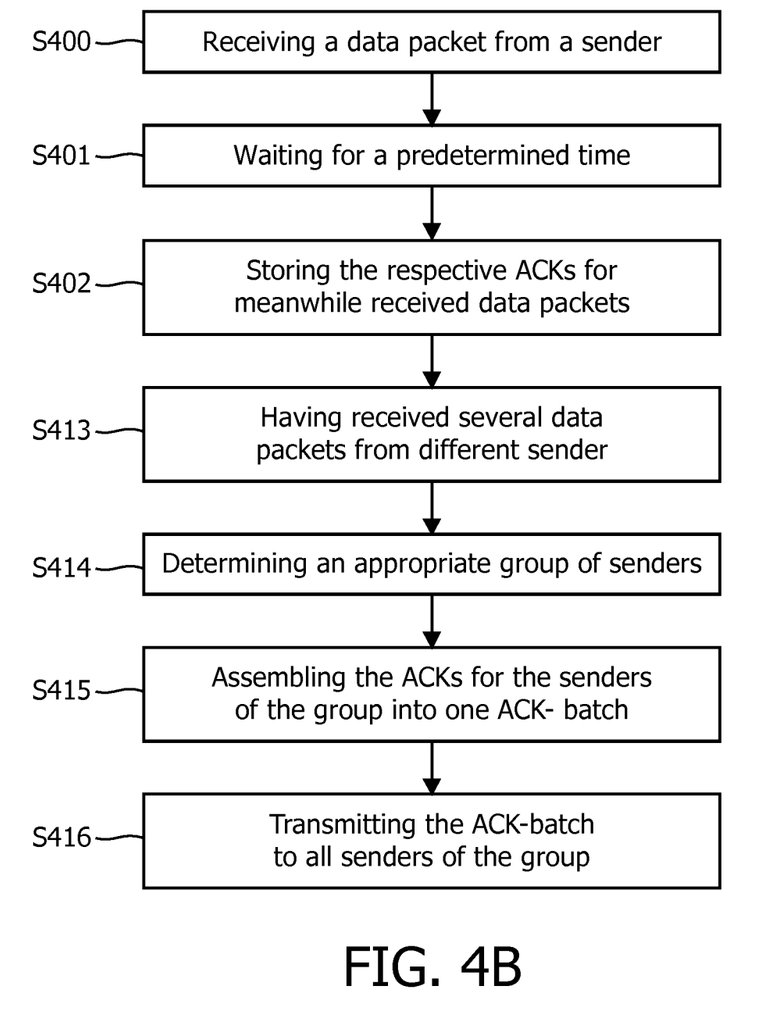
FIG. 4B illustrates a flow diagram for optimized data transmission according to a modification of the embodiment shown in FIG. 4A.

In FIG. 4B, a similar procedure is illustrated for the case that several data packets are received from different senders A. After having received a data packet (S400), the receiver B waits for a predetermined time interval (S401), whether more data packets are received, postponing and storing acknowledgements received during this time (S402). When it is determined that several data packets are received from different senders A within the predetermined time interval (S413), the receiver B can determine one or more appropriate groups of senders (S414). This may be based on the received data packets, on the answer to be transmitted, on the location of the senders A within the network, on the hop distance of the senders A to the receiver B or on network addresses of the senders A. However, the step of determining an appropriate group (S414) may also be omitted, for instance, when groups of senders A are predefined and stored in the receiver B. Finally, the acknowledgements to received data packets of senders A of one appropriate group are aggregated into one answer-batch or ACK-batch (S415) and the ACK-batch is then transmitted or multicast to all senders A of this group (S416). Thus, the receiver B groups or sorts the senders A of the received data packets. This is particularly useful, when the control center 60 or a data collector node 50 has to acknowledge a plurality of data packets sent from a plurality of nodes 10. Hence, depending on the underlying communication protocol, it is possible to map such answer-batches to network-efficient multicast groups. Possibly, not all senders A of the received data packets can be allocated to one of the appropriate groups of senders. In this case, their acknowledgements may be sent separately. Furthermore, it may happen that the senders A of the received data packets cannot be allocated all to the same appropriate group of senders. Then, several ACK-batches may be transmitted, one for each group of senders.

In a modification of the above described embodiments, it is further determined, whether the received data packet involves a time-critical answer. In case that the answer data packet is time-uncritical, a much larger waiting period may be chosen, so that the likelihood of answer aggregation is increased. Hence, the predetermined waiting time may be adjusted based on the required response time. Moreover, the predetermined time of step S401 may be defined such that it is within a specified deadline or answer interval as determined in S31. In case that different answer intervals are determined for the plurality of received data packets, the shortest answer interval may be chosen. Possibly, the predetermined waiting time is chosen randomly within the answer interval. By these means, network resources can be even more efficiently saved.

The embodiments as described above and illustrated in FIGS. 4A and 4B are not limited to the aggregation of acknowledgements. Headers may also be saved when transmitting other answer data packets by aggregating several answer data packets into one answer-batch. It is pointed out that the answer-batch as well as the acknowledgement batch comprises a plurality of independent answers or acknowledgements, respectively. This way, network resources are saved and data traffic is reduced.

In a further embodiment of the present invention, transmissions of data packets, especially of time-uncritical data packets, are scheduled considering additionally network topology in order to minimize data collisions and subsequent data packet losses. The transmission schedule may be applied to N:1 or to 1:N communication patterns, e.g. to communication links from a data collector node 50 to the plurality of nodes 10 or from the plurality of nodes 10 to the data collector node 50. However, even though the communication from the nodes 10 to the data collector node 50 or to the control center 60 is more efficient than in the opposite direction, there is still room and need for improvement, because the biggest bulk of information to be communicated in a RF telemanagement system will be statistical data or status report information from the nodes 10. Therefore, this embodiment is preferably adopted for N:1 communications from the nodes 10 to the data collector node 50 or to the control center 60 and will thus be explained using this example. The transmission schedule may be based on at least one of the location of the senders A within the network, the hop distance of the senders A to a data collector node 50 and the network addresses of the senders A.

When the transmission schedule is based on the location of the senders A within the network, different areas may be defined such that the communication links 40 from nodes 10 of different areas do not interfere with each other. This avoids overloading of certain bottleneck areas of the network, in particular in the vicinity of a data collector node 50. Sender nodes 10 may find out about their location by consulting their network or MAC address. The transmission schedule may be established and distributed by the control center 60 or data collector node 50 and indicate, when nodes 10 of different network areas are expected to report their data to the control center 60 or data collector node 50. Alternatively, the control center 60 or data collector node 50 may poll the nodes 10 based on their location in the network.

Figure 5A:
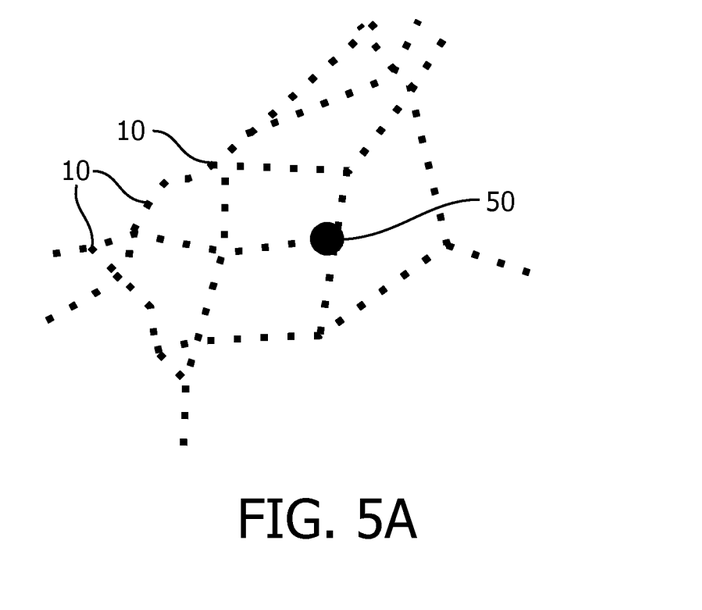
FIG. 5A illustrates a spatial distribution of nodes in an outdoor illumination telemanagement system.

In FIG. 5A, a street illumination system is shown, with luminaire nodes 10 being distributed along the streets. Thus, when the luminaire nodes 10 report their statistical data to a data collector node 50, e.g. power status, dimming status, ambience brightness or the like, the data transmission may be scheduled based on spatial or geographical grouping. Alternatively, it may be advantageous to group the luminaire nodes 10 based on the road network, i.e. luminaire nodes 10 in the same street report their data at the same time. Preferably, luminaire nodes 10 that are farer away from the data collector node 50 transmit their data packets later in time than luminaire nodes 10 close to the data collector node 50.

Figure 5B:
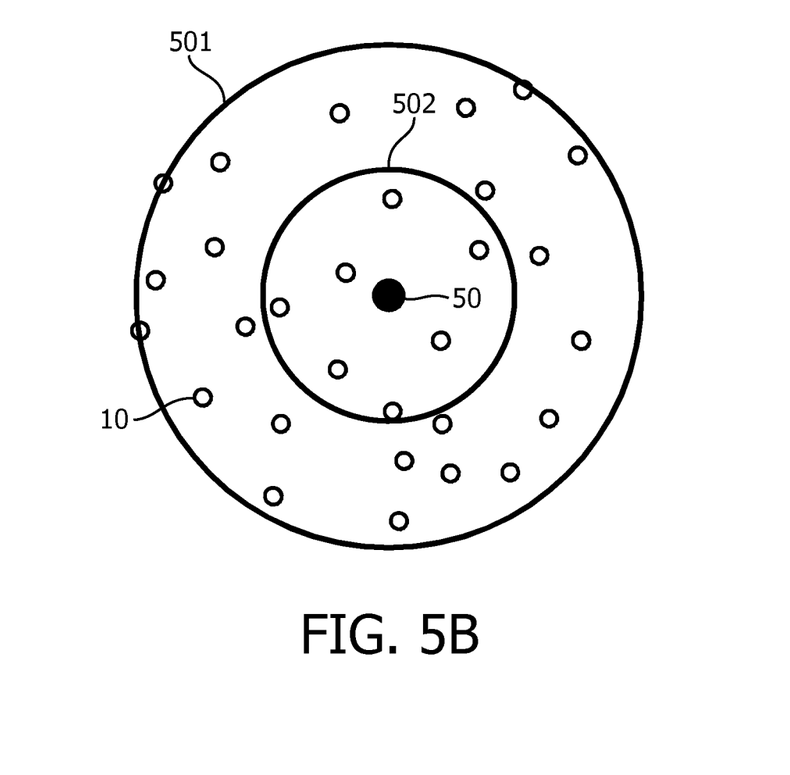
FIG. 5B shows a schematic view of a wireless mesh network illustrating hop-distances of nodes to a data collector node.

In a modification of the above-described embodiment, the transmission scheduling is based on a hop-distance from the luminaire nodes 10 to the data collector node 50. As shown in FIG. 5B, luminaire nodes 10 in a wireless mesh network using multi-hop transmissions can be classified by their hop-distance to the data collector node 50. The hop-distance relates to the number of hops necessary to transmit the data packet from the sender node 10 to the data collector node 50. For instance, a luminaire node 10 between radius 502 and radius 501 will transmit its data packet with two hops, whereas a luminaire node 10 within radius 501 can transmit its data packet with one hop. The hop-distance or hop-count information may be available at the network layer of the luminaire node 10. In one exemplary embodiment, data packets are transmitted from areas defined by their hop distance to the data collector node 50 in a progressive manner. Preferably, low hop-distance areas (e.g. within radius 501) are scheduled to report first or are simply first polled by the data collector node 50. By these means, it is ensured that, once the luminaire nodes 10 of a low hop-distance area have reported their data packets, they act only as routers forwarding the data packets from luminaire nodes 10 of higher hop-distance areas. By these means, luminaire nodes 10 in a low hop-distance area, which are normally very likely to be overload due to the network topology, will be relieved.

Possibly, the spatial scheduling of data packet transmission based on at least one of the location of the senders A within the network, the hop distance of the senders A to a data collector node 50 (or network controller 60) and the network addresses of the senders A is combined with the temporal scheduling by random selection of a time slot within the answer interval or by aggregating answers into one answer-batch. By these means, the network load can be balanced over time as well as over the different network regions.

In a further modification of the above-described embodiment, the transmission schedule is based on the network addresses of the luminaire nodes 10. Thus, the luminaire nodes 10 may transmit their answer data packets at different moments in time, after having received e.g. a report-request message broadcasted or multicasted by the control center 60 or the data collector node 50. The broadcast or multicast message may contain a time stamp serving as a common reference for all reporting luminaire nodes 10. Based on this reference time and a node-specific or network-address-specific delay, each luminaire node 10 can determine its individual transmission time. This further minimizes the risk of collisions, while the data packets from all luminaire nodes 10 are received within a relatively short period of time. This is particularly advantageous, when the luminaire nodes 10 report status data or the like in a N:1 communication pattern to the data collector node 50 or to the control center 60. In case that network addresses are distributed in a dynamic fashion, a schedule table with delays specified for each network address may be stored in each luminaire node 10 and the network addresses may be dynamically allocated to the luminaire nodes 10 based on current requirements, thus determining the individual transmission time.

In a further embodiment of the present invention similar to the embodiment of transmission scheduling, back-off delays are introduced by the MAC layer or by the network layer for retransmissions of data packets. A back-off delay refers to a delay between subsequent transmission attempts. For instance, when a transmission has failed, the sender node A may delay a retransmission of the data packet by the back-off delay, so that another node may complete its transmission, thus reducing a collision probability. Thus, the back-off delay may include a back-off time for medium access attempts. Here, medium access attempt relates to the process of carrier sensing and the subsequent transmitting or retransmitting of a data packet, when the medium is assessed to be free. Thus, the back-off time for medium access attempts denotes the time interval between subsequent medium access attempts. The back-off delays are set based on at least one of the location of the node 10 within the network, the hop-distance between the node 10 and the data collector node 50 and the network address of the node 10. Preferably, at least one of the MAC layer and network layer back-off delays are dependent on the distance between the node 10 and the data collector node 50. In particular, at least one of the MAC layer back-off delay and the network layer back-off delay becomes longer for increasingly remote nodes 10. In this case, nodes 10 that are farer away from the data collector node 50 may be forced to spread their data packets more than nodes 10 close to the data collector node 50. By these means, remote nodes 10 do not cause overload at nodes 10 that are closer to the data collector node 50. Therefore, data traffic generation of the network nodes 10 is shaped such to avoid congestion near the data collector node 50. Advantageously, this embodiment is employed together with at least one of the above-described embodiments.

Preferably, the above-described embodiments involving a delay of data packet transmission are applied to time-uncritical data and/or to data transmissions that have no stringent requirements on communication delay homogeneity across the network. For example, such time-uncritical data may refer to statistical data or status information reported by network nodes 10 in regular time intervals, such as consumed energy, burning hours, operation status, current or average dimming pattern, sensed ambience brightness or the like. In contrast, time-critical information may refer to acknowledgements for control messages sent to the network nodes 10 during emergencies.

It is obvious, that the above-described embodiments can be combined in various ways. By means of the above-described scheduling of transmission times, local and global network load can be reduced and data packet collisions and subsequent data losses can be avoided. Thus, routing means for a wireless mesh network are provided that allow highly efficient and reliable data transmission, provide high scalability and fast and easy configuration and are capable of self-configuration and self-healing.

The invention claimed is:

1. A system for controlling data packet transmission in a wireless network, the system comprising:
    a plurality of nodes; and
    at least one data collector node,
    wherein at least one control unit included in at least one of the plurality of nodes and/or the data collector node is adapted to randomly select, independently for each of the plurality of nodes configured to respond to a received data packet, a respective time slot within a determined answer interval for transmitting an answer responding to the received data packet, wherein the answer interval is applied to each of the plurality of nodes configured to respond to said received data packet and wherein at least one of any of the plurality of nodes and/or the data collector node determines: a) an amount of the plurality of nodes responding to said received data packet and b) a length of said answer interval based on the amount of the plurality of nodes determined to respond to said received data packet,
    wherein the data collector node is adapted to poll at least one given node of any of the plurality of nodes for data packet transmission based on a hop distance of the given node to the data collector node and/or a network area in which the given node is located, and
    wherein the data collector node is adapted to multicast a data request message to at least some of the plurality of nodes, to which the at least some of the plurality of nodes answer with a node-specific delay after having received the data request message.

2. The system according to claim 1, wherein the received data packet is at least one of a multicast or broadcast data packet sent to more than one receiver node or a request for data delivery.

3. The system according to claim 1, wherein the control unit is adapted to differentiate between time-critical and non-time critical data packets.

4. The system according to claim 1, wherein the answer interval is specific for the received data packet and/or the answer interval is determined based on at least one of
    a number of addressee nodes of the answer,
    network capabilities,
    a time stamp,
    information included in the received data packet,
    a predetermined deadline,
    current or expected network load, and
    a stored schedule.

5. The system according to claim 1, wherein a transmission of a given data packet is scheduled based on a location of at least one node in which said control unit is included within the network and/or based on a hop distance of the at least one node to the data collector node and/or on a network address.

6. The system according to claim 5, wherein the given data packet is a first given data packet, wherein the transmission of the first given data packet is scheduled to be prior to a transmission of a second second data packet, wherein the transmission of the second data packet is performed in an area with a hop distance to the data collector node that is greater than a hop distance in an area in which said the transmission of the first given data packet is performed.

7. The system according to claim 1, wherein the control unit is adapted to set back-off delays based on a spatial distance between at least one node in which said control unit is included and the data collector node and/or based on a hop distance of the at least one node to the data collector node and/or on a location of the at least one node within the network and/or on a network address.

8. The system according to claim 1, wherein the control unit is adapted to aggregate answers to more than one received data packet in one answer-batch.

9. The system according to claim 8, wherein the control unit is adapted to postpone the answers to the received data packets for aggregation in the answer-batch such that the answers are transmitted within a respective answer interval.

10. The system according to claim 8, wherein the control unit is adapted to aggregate answers to an individual node and/or to aggregate answers to a predetermined group of nodes.

11. The system according to claim 10, wherein for aggregation of answers to the predetermined group, the control unit is adapted to determine the group of nodes based on a distance between the nodes in the group of nodes.

12. The system according to claim 1, wherein the system is a lighting system for switching on/off and/or controlling dimming patterns of luminaire nodes and wherein the control unit is used in telemanagement of the system.

13. The system according to claim 1, wherein the answer is at least one of a time-uncritical data packet or an acknowledgement of the received data packet.

14. The system according to claim 1, wherein the length of said answer interval is dependent on the amount of the plurality of nodes determined to respond to said received data packet such that the length of said answer interval increases with an increasing amount of the plurality of nodes determined to respond to said received data packet.

15. The system according to claim 1, wherein at least a subset of said plurality of nodes is configured to infer said amount of the plurality of nodes.

16. The system according to claim 1, wherein at least a subset of said plurality of nodes is configured to infer said amount of the plurality of nodes determined to respond to said received data packet from at least one address of said data packet to determine said length of said answer interval.

17. A method for controlling data packet transmission in a wireless network comprising a plurality of nodes and at least one data collector node, said method comprising:
   at least one of the plurality of nodes and/or the at least one data collector node determining: a) an amount of the plurality of nodes responding to said received data packet and b) a length of an answer interval based on the amount of the plurality of nodes determined to respond to a received data packet;
   randomly selecting, independently for each of the plurality of nodes configured to respond to said received data packet, a respective time slot within the determined answer interval for transmitting an answer responding to the received data packet, wherein the answer interval is applied to each of the plurality of nodes configured to respond to said received data packet;
   polling at least one given node of any of the plurality of nodes for data packet transmission based on a hop distance of the given node to the data collector node and/or a network area in which the given node is located; and
   multicasting a data request message to at least some of the nodes, to which the at least some of the nodes answer with a node-specific delay after having received the data request message.

18. The method according to claim 17, wherein at least a subset of said plurality of nodes is configured to infer said amount of the plurality of nodes determined to respond to said received data packet from at least one address of said data packet to determine said length of said answer interval.

19. A system for controlling data packet transmission in a wireless network, the system comprising:
   a plurality of nodes; and
   at least one data collector node,
   wherein at least one control unit included in at least one of the plurality of nodes and/or the data collector node is adapted to randomly select, independently for each of the plurality of nodes configured to respond to a received data packet, a respective time slot within a determined answer interval, wherein the answer interval is applied to each of the plurality of nodes configured to respond to said received data packet and wherein at least one of any of the plurality of nodes and/or the data collector node determines: a) an amount of the plurality of nodes responding to said received data packet and b) a length of said answer interval based on the amount of the plurality of nodes determined to respond to said received data packet, and
   wherein each given node of the plurality of nodes configured to respond to the received data packet is configured to transmit a respective answer during the respective time slot selected for the given node in response to said received data packet.

20. The system of claim 19, wherein at least a subset of said plurality of nodes is configured to infer said amount of the plurality of nodes determined to respond to said received data packet from at least one address of said data packet to determine said length of said answer interval.

* * * * *